Aug. 11, 1959  G. P. ADAMS  2,898,630
APPARATUS FOR FORMING SPRING CORDS
Filed May 28, 1957  8 Sheets-Sheet 1

INVENTOR.
G. P. ADAMS
BY
ATTORNEY

Aug. 11, 1959   G. P. ADAMS   2,898,630
APPARATUS FOR FORMING SPRING CORDS
Filed May 28, 1957   8 Sheets-Sheet 2

INVENTOR.
G. P. ADAMS
BY A. C. Schwarz Jr.
ATTORNEY

Aug. 11, 1959  G. P. ADAMS  2,898,630
APPARATUS FOR FORMING SPRING CORDS
Filed May 28, 1957  8 Sheets-Sheet 3

INVENTOR.
G. P. ADAMS
BY
ATTORNEY

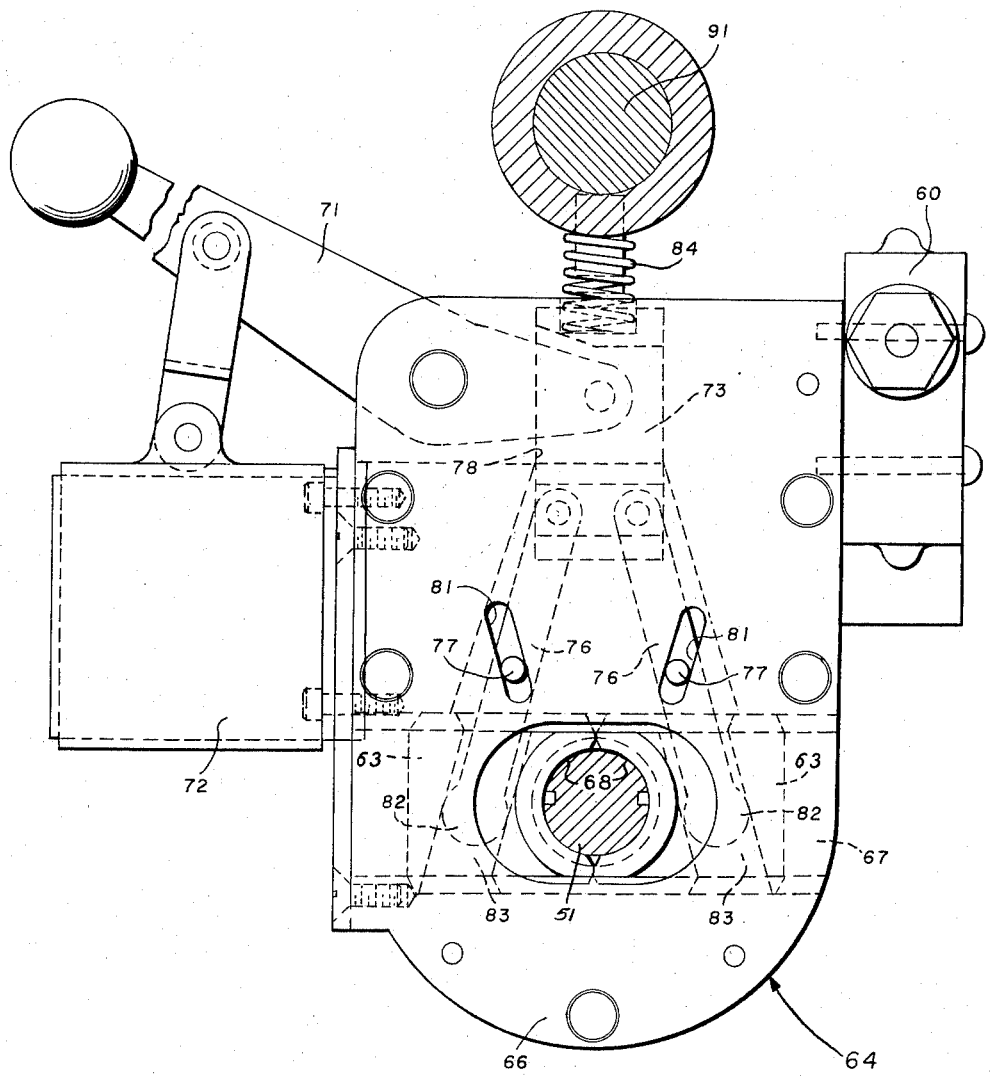

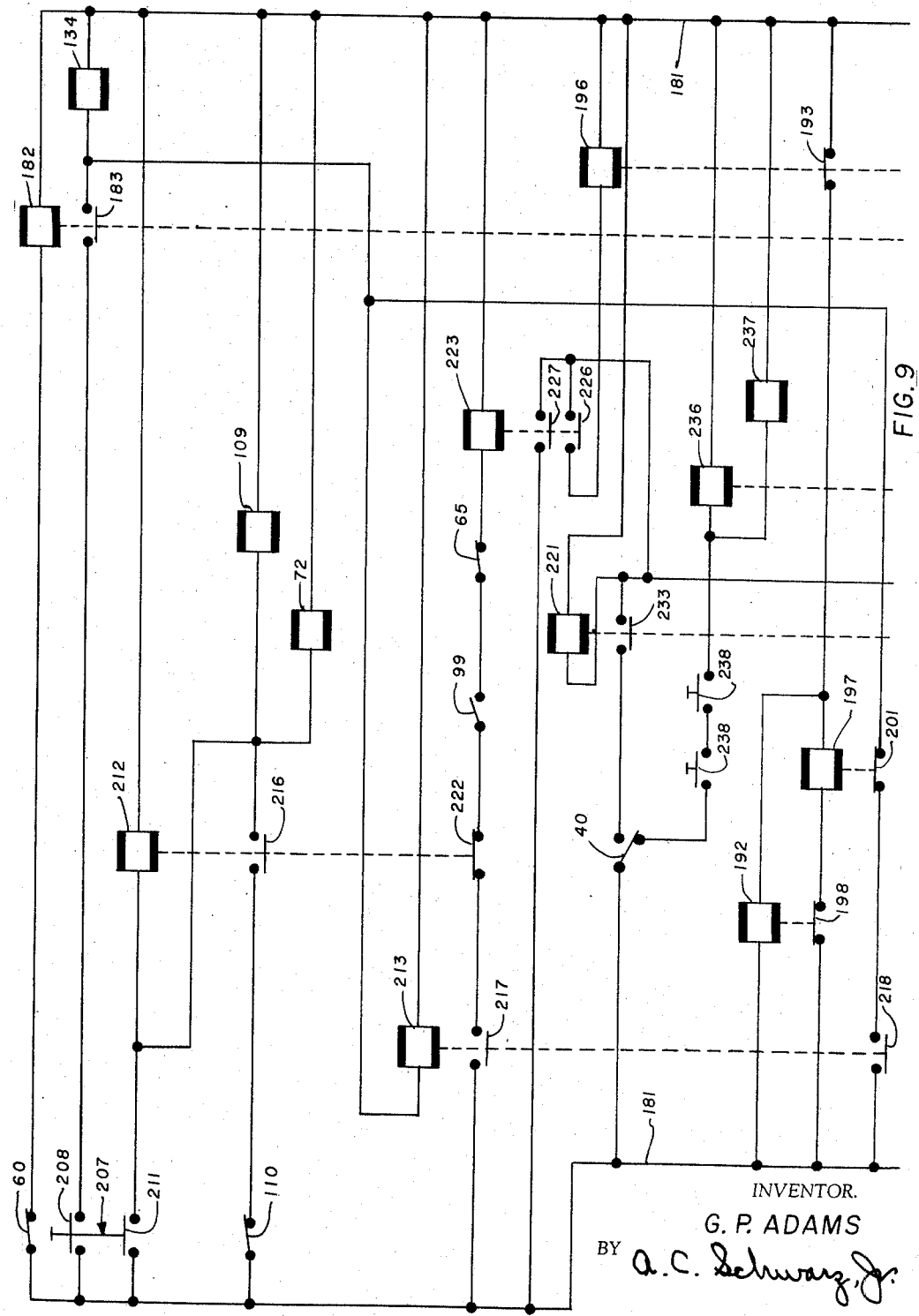

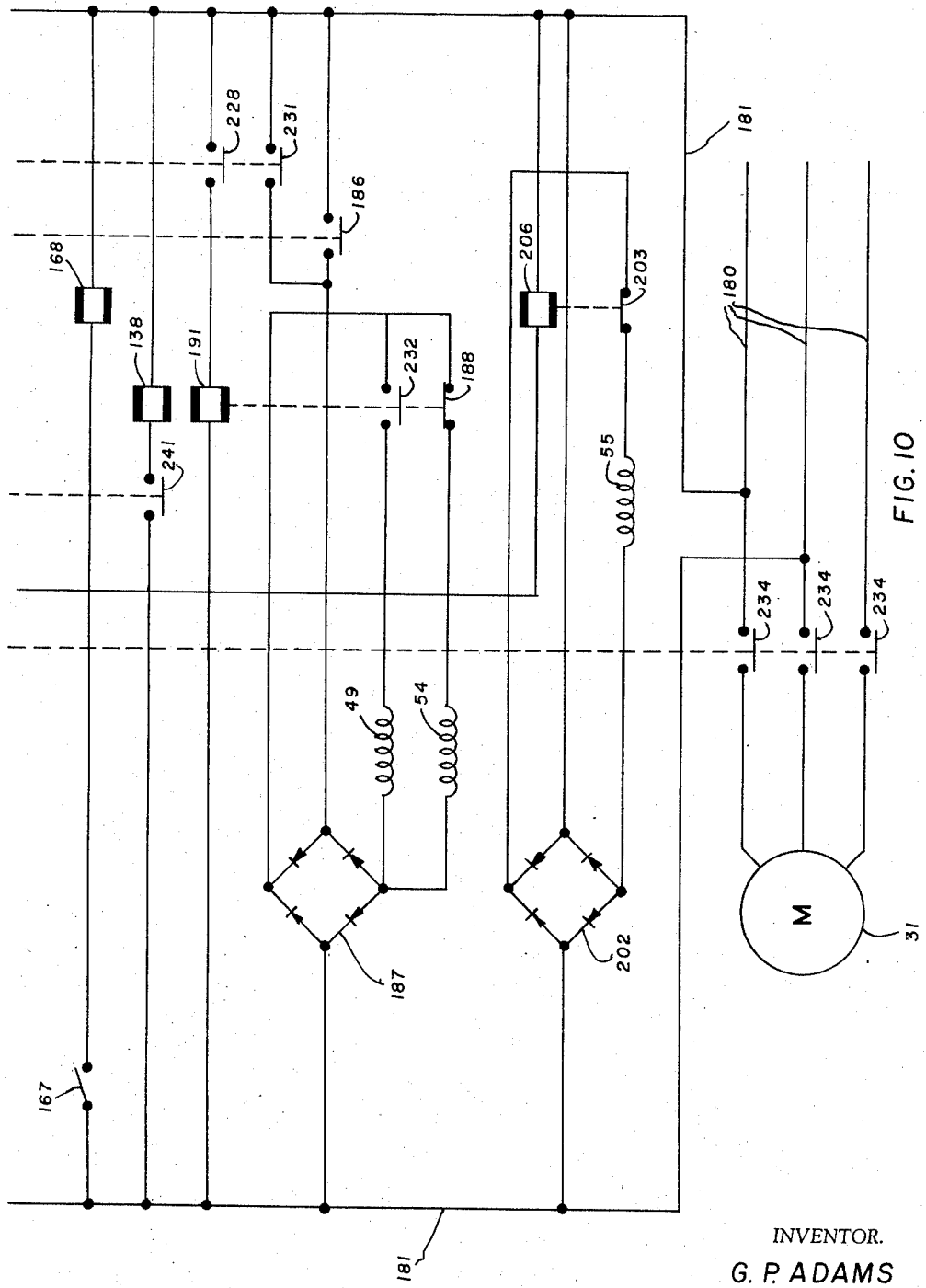

Aug. 11, 1959  G. P. ADAMS  2,898,630
APPARATUS FOR FORMING SPRING CORDS
Filed May 28, 1957  8 Sheets-Sheet 8

INVENTOR.
G. P. ADAMS
BY
ATTORNEY

United States Patent Office 2,898,630
Patented Aug. 11, 1959

2,898,630

APPARATUS FOR FORMING SPRING CORDS

George P. Adams, Baltimore, Md., assignor to Western Electric Company, Incorporated, New York, N.Y., a corporation of New York Application May 28, 1957, Serial No. 662,127

4 Claims. (Cl. 18—19)

This invention relates principally to apparatus for forming a spiral formation with uncoiled end portions thereon, and may relate more particularly to apparatus for coiling jacketed cordage on a mandrel in the form of a helix with straight ends extending therefrom.

In the telephone and other arts, it is frequently desirable to connect electrically-operated devices by a compact helically coiled, extensible or spring cord, the length of which may be extended by slight tension but which returns to its compact form when the tension is relieved.

One method of manufacturing spring cords having the above properties, as disclosed in the patent to A. R. Kemp et al., 2,413,715, includes axially twisting rubber-jacketed cordage as it is wound in the form of a helix on a mandrel, the twist being applied in such a direction as to force the adjacent turns closely together. The mandrel, with the helically wound cordage clamped thereon, is then placed in an oven and subjected to heat treatment which relieves partially the stresses in the jacket and core of the cordage to an amount such that the jacket retains its form in a closed helix when the clamps are removed but with certain torsional stresses remaining in the jacket and core to force the turns of the helix together.

One of the problems arising in the manufacture of spring cords by such a method results from the necessity of having a predetermined amount of free, uncoiled, untwisted cordage at each end of the helical portion of the spring cord so that the cordage insulation may be stripped near the ends, and terminals secured to the ends of the conductors therein. The particular application for which the spring cord is to be used determines the lengths of the uncoiled end portions, which, in some cases, have two different lengths on each end of a single spring cord.

It is an object of the present invention to provide new and improved apparatus for forming a spiral formation with an uncoiled end portion thereon.

It is another object to provide new and improved apparatus for forming spring cords.

It is a further object to provide new and improved apparatus for coiling jacketed cordage on a mandrel in the form of a helix with straight ends extending therefrom.

An apparatus illustrating certain features of the invention may include means for supplying elongated material, a pivotable unit, a mandrel mounted rotatably on said pivotable unit and positioned adjacent to said material supply means, means for rotating said mandrel and for moving said mandrel longitudinally for winding cordage from said material supply in a helix on said mandrel, and means for pivoting said pivotable unit to a position in which said mandrel is removed from said material supply means, whereby an uncoiled end portion is provided on the helix of cordage on said mandrel.

A clear understanding of the invention may be had from the following detailed description of a specific embodiment thereof, when read in conjunction with the appended drawings, in which:

Figs. 1 and 2 form a composite side elevation of an apparatus embodying certain features of the invention, certain portions thereof being broken away for clarity;

Fig. 8 is an enlarged section taken along line 8—8 of Fig. 1;

Figure 1:
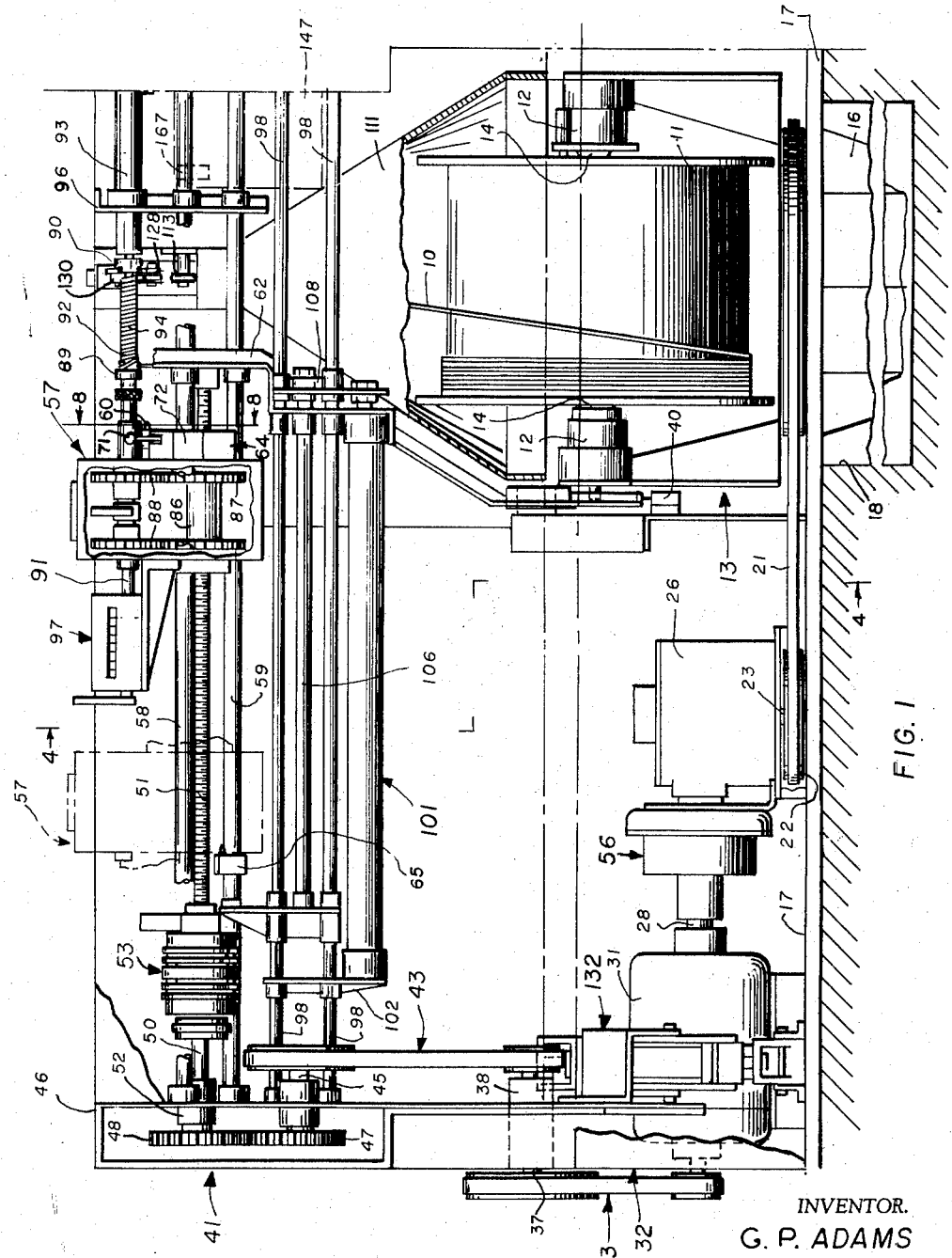
Figures 9, 10, 11, 12:
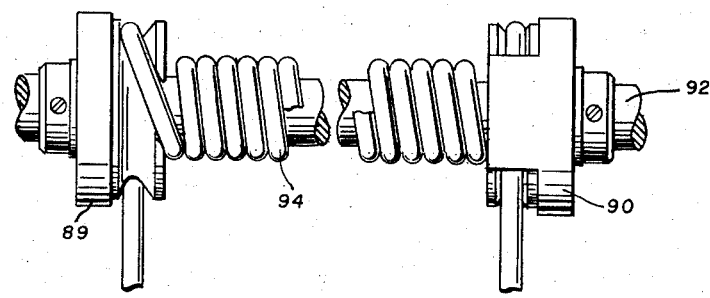

Figs. 9 and 10 form a composite schematic electrical circuit for use with the apparatus of Fig. 1;

Fig. 11 is a diagrammatic view showing how Figs. 9 and 10 are arranged together to complete the electrical circuit, and Fig. 12 is a view of a mandrel having cordage wound thereon to form a spring cord.

Referring to Fig. 1, a supply reel 11 for supplying cordage 10 is received upon a removable arbor (not shown) and frustoconically faced members 14—14 which are rotatably mounted within suitable bearings 12—12 comprising a portion of a rotatable carriage, indicated generally by the numeral 13. The rotatable carriage 13 is mounted rotatably within suitable bearings (not shown) comprising part of a mounting assembly 16 secured rigidly to a floor plate 17 and extending downwardly into a pit 18.

A circular V-shaped groove extends around a portion of the rotatable carriage 13 and has received within it a V-belt 21 which is also received within a V-shaped groove of a pulley 22 keyed to an output shaft 23 of a gear reducer 26. An input shaft (not shown) of the gear reducer 26 is connected positively to an output shaft 28 of a drive motor 31 mounted securely to the floor plate 17. The motor 31 may be, for example, a 3 H.P., 1800 r.p.m. motor having its output shaft 28 extending from both ends of the motor.

Figure 3:
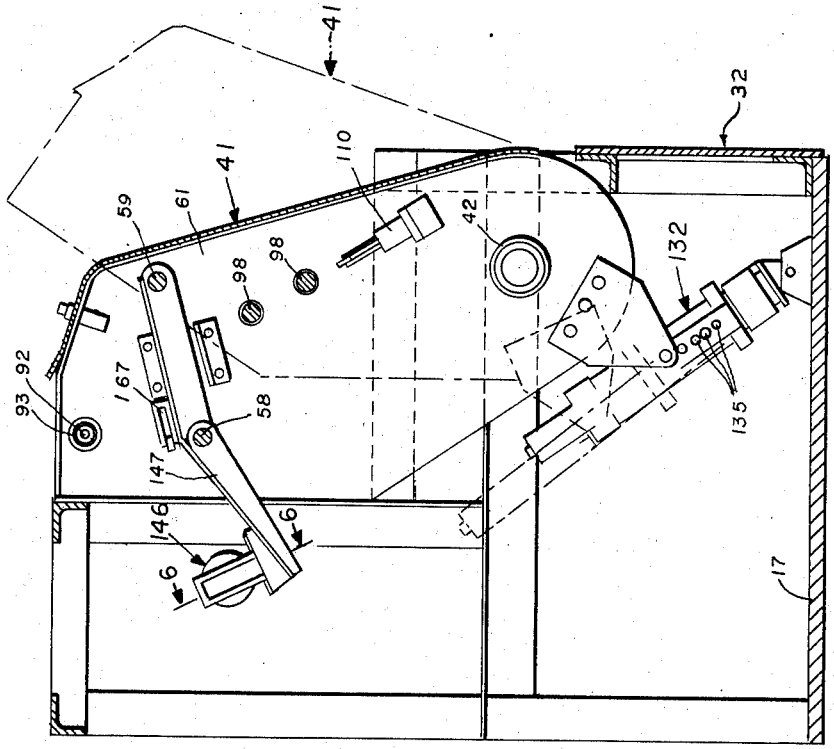
Fig. 3 is a vertical section taken along line 3—3 of Fig. 2.
Figure 4:
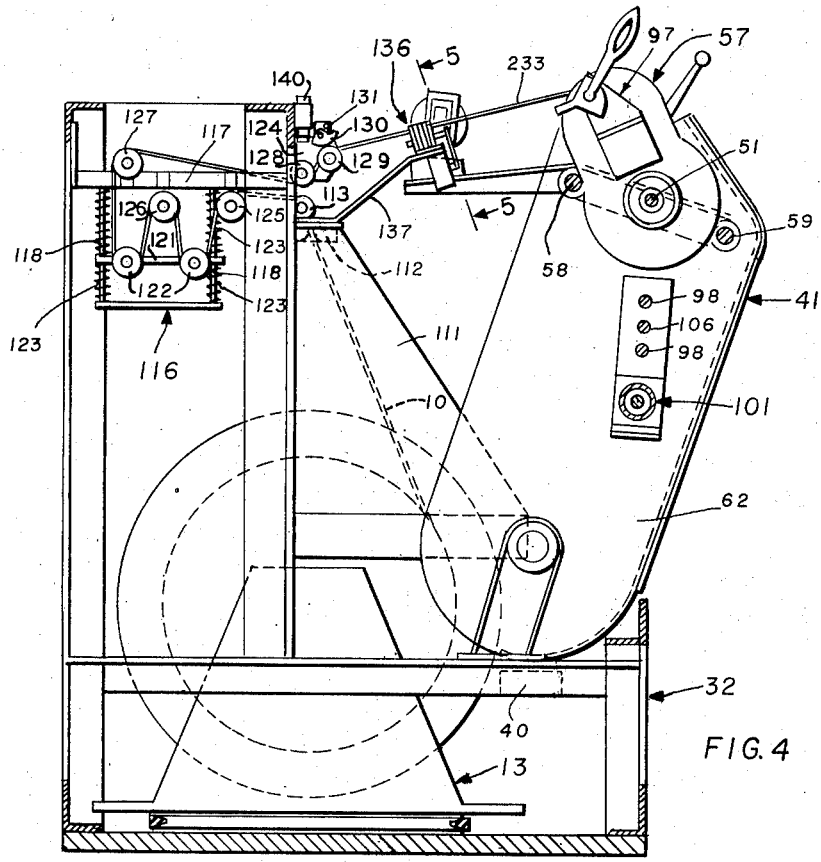
Fig. 4 is a vertical section taken along line 4—4 of Fig. 1, showing the apparatus in a different operating position than Fig. 3.

The output shaft 28 of the drive motor 31 extends through a frame, indicated generally by the numeral 32, and drives a V-belt and pulley transmission 33, which is connected operatively to a shaft 37 mounted rotatably within a bearing assembly received within a sleeve 38 mounted rigidly within the frame 32. A pivotable unit, indicated generally by the numeral 41 and best shown in Figs. 3 and 4, is mounted pivotally upon the sleeve 38 and upon a similar sleeve 42 mounted rigidly within the frame 32 at the opposite end of the machine and may be pivoted between the positions shown in dotted and solid lines in Fig. 3. A switch 40 (Figs. 1, 4 and 9) is mounted upon the frame 32 in such a position as to be actuated by the pivotable unit 41 when in an open or rightward position, as viewed in Fig. 4. The shaft 37 transmits rotary motion to a V-belt and pulley transmission, indicated generally by the numeral 43, which drives a shaft 45 mounted rotatably through suitable bearings within a left frame 46, forming a portion of the pivotable unit 41.

A spur gear 47 is keyed to the shaft 45 and drives another spur gear 48 keyed to a shaft 50 mounted rotatably within suitable bearings 52 mounted within the left frame 46. The shaft 50 may be connected selectively to a threaded shaft 51 through an electromagnetic, clutch-brake coupling, indicated generally by the numeral 53. The clutch-brake coupling 53 includes a rotatable electromagnetic clutch having a solenoid 49 (Fig. 10) associated therewith which, when energized, causes the clutch to connect the shaft 50 and the threaded shaft 51. The clutch-brake coupling also includes an electromagnetic brake having a solenoid 54 (Fig. 10) associated therewith which, when energized, causes the brake to brake the threaded shaft 51.

An electromagnetic brake, indicated generally by the numeral 56, is secured to the base of the gear reducer 26 and is provided for braking the output shaft 28 of the drive motor 31 and the apparatus connected positively thereto, such as the rotatable carriage 13. The brake 56 has a solenoid 55 (Fig. 10) associated therewith, which when energized causes the brake 56 to be actuated.

A mandrel carriage, indicated generally by the numeral 57, is mounted slidably upon two rods 58 and 59, both of which are secured rigidly between the left frame 46 and a right frame 61 which also forms a portion of the pivotable unit 41.

A switch 60 (Figs. 1, 8 and 9) is mounted upon the mandrel carriage 57 in such a position that it may be opened when the carriage 57 is moved to a far right position, as viewed in Fig. 1, against a support member 62 (Figs. 1 and 4). The support member 62 is mounted pivotally on the frame 32, as is best shown in Fig. 4, and provides support in the central portion of the pivotable unit 41. The support 62 has the rods 58 and 59 secured rigidly thereto and the threaded shaft 51 secured rotatably thereto and provides support for these members. A switch 65 (Figs. 1 and 9) is mounted upon the shaft 59 in such a position that it is actuated to an open position when the mandrel carriage in a far left position, as viewed in Fig. 1, forces against it.

The mandrel carriage 57 may be moved along the rods 58 and 59 by rotation of the threaded shaft 51, the threads of which may engage a pair of threaded followers 63—63 of a follower assembly, indicated generally by the numeral 64, (best shown in Fig. 8), which is a portion of the carriage 57.

The follower assembly 64 comprises a body member 66 having a horizontal aperture 67 extending the width of the body member 66. The threaded shaft 51 is received through a circular orifice formed by a pair of threaded semicircular faces 68—68 composed of wear resistant material and formed upon the followers 63—63. The followers 63—63 may be moved inwardly into engagement with the threaded shaft 51 or outwardly away from that shaft by the upward or downward movement, respectively, of a lever 71. Downward movement of the lever 71 by hand or by the action of a solenoid 72 (Figs. 8 and 9) causes upward movement of a force transmitting member 73 and of elongated members 76—76 attached pivotally thereto. The member 73 is guided, so as to move vertically, by a surface 78 of a recess in the body member 66.

Each elongated member 76 has a follower 77 which projects through a respective slot 81 in the body member 66. The slots 81 are so sloped that ball-like extremities 82—82 of the elongated members 76—76 are pivoted outwardly from the threaded shaft 51 by the camming action of the followers 77—77 against the surfaces of the slots 81—81 when the elongated members 76 are moved upwardly by the upward vertical movement of the member 73. The outward and upward movement of the ball-like extremities 82—82 causes outward movement of the followers 63—63 because of the camming action of the extremities 82—82 against the surfaces of recesses 83—83 in the followers 63—63. The outward follower movement is accentuated by the slope of the recesses 83—83.

Upward movement of the lever 71 by hand or downward movement of the right end thereof by the action of a spring 84 causes downward movement of the member 73 and downward movement and inward pivoting of the extremities 82—82 of the elongated members 76—76, which causes the followers 63—63 to be moved inwardly into engagement with the threaded shaft 51, which inward follower movement is also increased because of the slope of the recesses 83—83.

The threaded shaft 51 has a pair of slots extending longitudinally thereof and arranged at 180° along the periphery of the threaded shaft 51. A hollow shaft 86 is mounted rotatably within the frame of the mandrel carriage 57 and has a pair of keys (not shown) mounted rigidly therein which engage the slots in the threaded shaft 51 to form a sliding keyway drive for rotation of the hollow shaft 86 and for rotation of a pair of gears 87—87, which are keyed to the shaft 86 for rotation therewith and which are arranged to drive a pair of gears 88—88 attached positively to a shaft 91 mounted rotatably within the frame of the mandrel carriage 57 and extending from either side of the carriage 57.

The right extension of the shaft 91, as viewed in Fig. 1, is connected positively but detachably to a mandrel 92 in any suitable manner, for example, such as that shown in Fig. 8 of the U.S. patent to W. L. Ames, No. 2,565,465, and described in detail in that patent. The opposite end of the mandrel 92 is received within a tubular member 93 mounted rigidly upon and so as to extend between the right frame 61 and a support member 96 which is secured rigidly to the rods 58 and 59. A pair of clamps 89 and 90, such as the clamps shown in Fig. 9 of the above-mentioned patent to Ames, are received upon the mandrel 92 for clamping each end of a helix 94 (shown partially formed in Fig. 1) of cordage which is to be formed upon the mandrel 92.

The left extension of the shaft 91, as viewed in Fig. 1, is connected to a counter, indicated generally by the numeral 97. The shaft 91 drives counting wheels within the counter 97 so as to register the number of revolutions of the mandrel 92. The counter 97 also is provided with indexing wheels which may be set to cause the opening of a sensitive switch 99 (Fig. 9) at the time the mandrel has completed a predetermined number of revolutions.

A pair of shafts 98—98, which are secured rigidly between the left frame 46 and the right frame 61, support an air cylinder system, indicated generally by the numeral 101. The air cylinder system 101, which is secured rigidly by a bracket 102 to the shafts 98—98, is also supported by the support member 62. The support 62 has apertures therein for the reception of the shafts 98 which are attached rigidly to the support member 62. An aperture is also provided in the support 62 for the slidable reception of a shaft 106, which connects the air cylinder system 101 by means of a slidable member 108 to a bracket 107.

Figure 2:
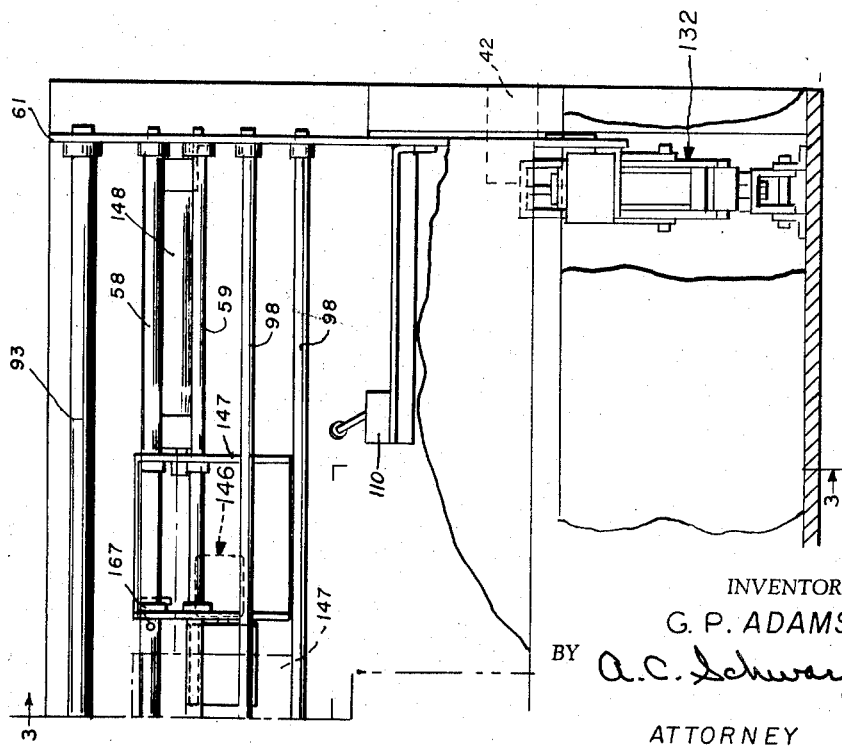

The bracket 107 has an upwardly extending projection having a rubber bumper thereon, which can be used to urge the mandrel carriage rightwardly when the followers 63—63 are not engaged with the threaded shaft 51. The air cylinder system 101 may be actuated by admission of air to the left end thereof to move the bracket 107 rightwardly or to the right end thereof to move the bracket 107 leftwardly. An air valve (not shown) having a solenoid 109 (Fig. 9) is provided for controlling admission of air to the air cylinder system 101. When the solenoid 109 is energized, the air cylinder system 101 is operated to force the bracket 107 rightwardly and when the solenoid 109 is not energized, to force the bracket 107 leftwardly. A switch 110 is mounted upon the right frame 61 in such a position as to be operated by the piston of the air cylinder system 101 when in far right position, as viewed in Figs. 1 and 2. The switch 110 (see also Fig. 9) is closed normally but is opened when the piston of the air cylinder system 101 is in far right position.

A supply guard 111 (Figs. 1 and 4) is secured rigidly to the frame 32 and is so located as to guide cordage 10 being drawn from the supply reel 11 onto the rotating mandrel 92. The cordage 10 passes through a guide 112 secured rigidly to the frame 32 and around a guide sheave 113 secured rotatably to the frame 32 and then to an accumulator assembly, indicated generally by the numeral 116. The accumulator assembly 116 is mounted upon a bar 117 secured to the frame 32 and comprises a pair of vertical rods 118—118 secured rigidly to the bar 117. A horizontal bar 121 is mounted slidably upon the vertical rods 118 and has a pair of sheaves 122—122 mounted rotatably thereon.

The rods 118—118 have springs 123—123 received thereon for providing a force tending to return the bar 121 to a central position on the rods 118—118. The cordage is drawn around a sheave 125 secured to the bar 117, around one of the sheaves 122, and around a sheave 126 secured to the bar 117. The cordage 10 then passes around the other sheave 122, around a sheave 127 secured to the bar 117 and around rollers 128 and 129 to the mandrel 92. A guide member 130, along with the rollers 128 and 129, is mounted on a pivotal member 124 and serves to guide the cordage to the mandrel 92. The guide member 130 has a knurled eccentric face which serves to prevent the cordage 10 from moving opposite to its normal direction of travel between the guide 130 and the roller 129. A pin 131 is suitably mounted on the pivotal member 124 to prevent the cordage 10 from pivoting the guide 130 out of guiding relationship.

When the pivotable unit 41 is moved to the position shown in solid lines in Fig. 3, the mandrel is located just adjacent to the roller 129 and the guide 130 so that they may effectively guide the cordage 10 onto the rotating mandrel 92. This close relationship is necessary because the twisted nature of the cordage 10 tends to cause it not to coil in the desired helix but to coil around the already coiled portion of cordage 10. The pivotal member 124 has a shaft 140 which is secured pivotally to the frame 32. The ability of the pivotal member 124 to pivot allows for variations in the cordage which may flatten out to a greater or lesser degree when being coiled on the mandrel 92.

The pivotable unit 41 may be pivoted between the positions shown in solid and phantom lines in Fig. 3 by means of a pair of air cylinder systems, indicated generally by the numerals 132—132, connected pivotally to the floor plate 17 and connected pivotally to the frames 46 and 61, respectively. As is shown in Fig. 3, the amount of travel during pivoting of the pivotable unit 41 may be adjusted by means of a plurality of bores 135—135. The air cylinder systems 132—132 can be actuated by an air valve (not shown) having a solenoid 134 (Fig. 9) which, when de-energized, causes the valve to allow air to be admitted to the lower end of the cylinders 132—132, causing pivoting of the pivotable unit 41 to the position shown in Fig. 4. When the solenoid 134 is energized, the air valve causes admission of air to the upper end of the cylinders 132—132, causing pivoting of the pivotable unit 41 to the position shown in solid lines in Fig. 3.

Figure 5:
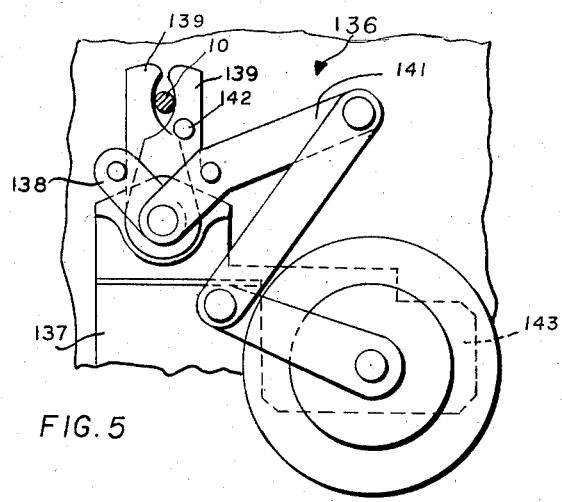
Fig. 5 is an enlarged, sectional view taken along line 5—5 of Fig. 4, with portions thereof broken away for clarity.

Referring to Figs. 4 and 5, a clamp, indicated generally by the numeral 136, is mounted on a leaf spring 137 secured to the frame 32. The clamp 136 is so positioned that when the pivotable unit 41 is pivoted from the position shown in solid lines in Fig. 3 to the position shown in solid lines in Fig. 4, the mandrel 92 moves in an arc over the clamp 136 to a position where the cordage 10 is received between jaws 139—139 of the clamp 136. A link 138 is attached pivotally at one end to the left jaw 139 (as viewed in Fig. 5) and at the other end to an end of an arm 141.

The jaws 139—139 are forced together by the action of a helical spring (not shown) and may be locked in an open position by the force of the helical spring when the pivotal connection of the link 138 and the arm 141 is moved upwardly past a straight line extending between the pivotal connection of the link 138 with the left jaw 139 and the pivotal connection of the arm 141 with the right jaw 139, causing the arm 141 to lock against a pin 142.

The jaws 139—139 may be closed to clamp the cordage 10 by the action of a rotary solenoid 143, which, when energized, forces upwardly on the right end of the arm 141, as viewed in Fig. 5, moving the pivotal connection of the link 138 and the arm 141 downwardly past the straight line extending between the pivotal connection of the link 138 with the left jaw 139 and the pivotal connection of the arm 141 with the right jaw 139, causing the above-mentioned helical spring to clamp the jaws 139—139 on the cordage 10. The jaws 139—139 are opened manually to their open, locked position by the operator after the solenoid 143 has been de-energized.

A cutting mechanism, indicated generally by the numeral 146 (Figs. 3, 6 and 7), is provided for cutting the cordage 10 when it is gripped in the jaws of the clamp 136 and is extending between the roller 129 and guide member 130 and the mandrel 92, as shown in Fig. 4. The cutting mechanism is mounted adjustably upon a carriage 147, which is received slidably upon the rods 58 and 59 and when the pivotable unit 41 is in the position shown in Fig. 4, the carriage 147 may be moved leftwardly or rightwardly, as viewed in Figs. 1 and 2, by an air cylinder system 148 mounted upon the right frame 61 and having its piston connected to the carriage 147.

Figure 6:
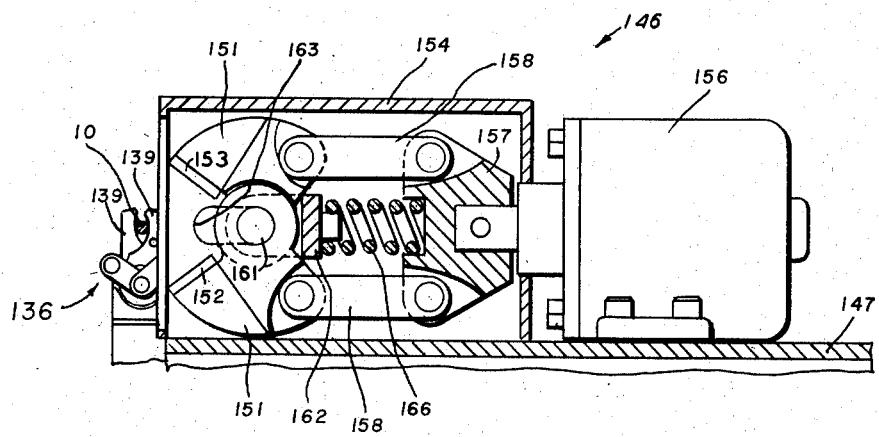
Fig. 6 is an enlarged, sectional view taken along line 6—6 of Fig. 3, with parts thereof broken away for clarity.
Figure 7:
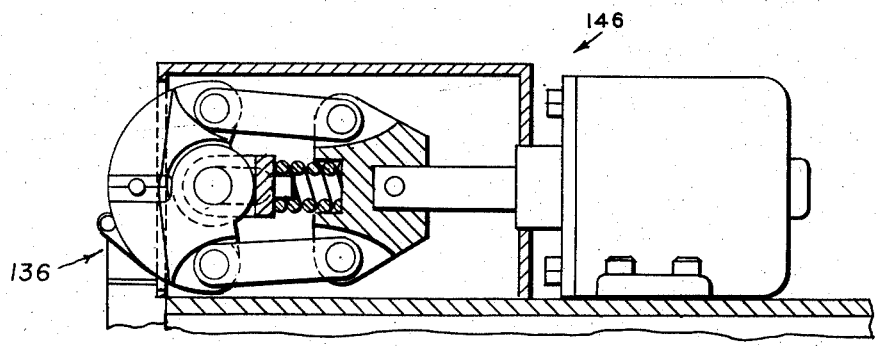
Fig. 7 is a section similar to Fig. 6, showing, however, the mechanism in a different operation position.

The cutting mechanism 146, shown in detail in Figs. 6 and 7, comprises a pair of jaws 151—151, one having an anvil 152 mounted thereon and one having a cutting edge 153 thereon. The jaws 151—151 are normally in an open position within a body member 154 which acts in part as a guard and is secured to the carriage 147; however, the jaws 151—151 may be moved leftwardly towards the cordage 10 being held between the jaws 139—139 of the clamp 136 and may be closed to cut the cordage 10 by the action of an air cylinder system 156. The air cylinder system 156 is secured rigidly to the carriage 147 and pivotally to a clevis 157 having links 158—158 mounted pivotally thereon.

Each link 158 is also mounted pivotally to a respective jaw 151. The jaws 151—151 are both mounted pivotally on a pin 161 received within a bore in a clevis 162. The pin 161 extends through and is slidably received within a slot 163 in the body member 154. A spring 166 is received between the clevises 157 and 162 and functions to force the two clevises apart. An electrical switch 167 (Figs. 2, 3 and 10) is mounted upon the carriage 147 and when the carriage 147 is moved leftwardly, as viewed in Figs. 1 and 2, to a position as shown in phantom lines in Fig. 1, the switch 167 is closed by striking the support member 96, which causes a solenoid 168 (Fig. 10) to be energized to actuate an air valve to admit air to the air cylinder system 156, thereby actuating the air cylinder system.

The air cylinder system 156 which is normally in the position shown in Fig. 6, forces the clevis 157 leftwardly, as viewed in Fig. 6. The leftward movement of the clevis 157 causes leftward movement of the links 158—158. However, the jaws 151—151 are not closed because the clevis 162 is also moved leftwardly by the spring 166. Thus, the jaws 151—151 maintain an open position as they are moved leftwardly to a position where the cordage is received between the jaws 151—151. The jaws 151—151 continue to move leftwardly in an open position until the pin 161 strikes the left end of the slot 163, as viewed in Fig. 6. Because the clevis 162 is then held stationary, the jaws 151 are pivoted to a closed cutting position, as shown in Fig. 7, by the continued leftward movement of the clevis 157 and the links 158—158. It should be noted that, as shown in Fig. 4, the cutting operation is performed upon the cordage 10 adjacent to the clamp 136 but between the clamp 136 and the mandrel 92.

Operation

Assume that it is desired to prepare a length of cordage upon the mandrel 92 that is twisted axially and coiled into a helix and has a predetermined amount of free cordage extending from each end of the helix so that the cordage may be stripped near the ends for securing terminals to the ends of the conductors therein. The operator inserts one end of the mandrel 92 into the tubular member 93 and attaches the other end of the mandrel to the shaft 91, for example, in the same manner as that described in the above-mentioned Ames patent.

Bus lines 180—180 (Fig. 10) are energized with three phase voltage which also produces an alternating voltage in lines 181—181. A relay 182 is energized through the normally-closed switch 60, causing contacts 183 and 186 to be closed. The closure of the contact 186 causes alternating voltage to be delivered to a rectifier 187 which in turn causes direct current to be supplied to the solenoid 54 through a normally-closed contact 188 of a relay 191. The resulting energization of the solenoid 54 causes actuation of the brake of the brake-clutch coupling 53 causing the threaded shaft 51 to be braked against rotation.

A timing relay 192 is energized through the normally-closed contact 193 of a relay 196. A timing relay 197 is energized through the normally-closed, time-to-open contact 198 of the relay 192; however, after a time delay of a second or two the contact 198 opens, de-energizing the relay 197. After a time delay of a second or two, a time-to-close contact 201 of the relay 197 closes.

Alternating voltage is delivered to a rectifier 202 from the lines 181—181 causing the solenoid 55 of the brake 56 to be supplied with direct current through a normally-closed contact 203 of a relay 206, causing actuation of the brake 56 to hold the output shaft 28 stationary and thus prevent rotation of the rotatable carriage 13 and also prevent rotation of other machinery connected positively to the drive motor 31.

The operator then presses a push button 207 which closes its normally-open contacts 208 and 211, causing energization of relays 212 and 213 and of solenoids 134, 109 and 72, the contact 183 being closed. The relay 212 is locked in as a result of the closing of its normally-open contact 216, the closing of which also causes locking in of the solenoids 109 and 72, the relay 212 and solenoids 109 and 72 being locked in through the normally-closed switch 110. When the relay 213 is energized, its normally-open contacts 217 and 218 are closed. The closure of contact 218 causes locking in of the relay 213 and of the solenoid 134 through the contacts 218 and 201.

The solenoid 72 being energized causes disengagement of the followers 63—63 from the screw 51, thus allowing the mandrel carriage 57 to be moved freely along the shafts 58 and 59. The energization of the solenoid 109 causes air to be admitted to the air cylinder system 101, causing the mandrel carriage 57 to be moved rightwardly, as viewed in Fig. 1.

The solenoid 134 being energized causes the pivotable unit 41 to be pivoted to the position shown in solid lines in Fig. 3, or, in other words, to the coiling position. As the pivotable unit 41 moves away from the open position shown in Fig. 4, the switch 40 is released by the pivotal unit 41 and closes in the circuit of relays 196, 206 and 221; however, these relays are not actuated at this time.

The carriage 57 is moved rightwardly, as viewed in Fig. 1, until the mandrel 92 is in a position to receive cordage 10 from the roller 129 and guide 130 and in which position the right side of the clamp 89 is positioned in front of the roller 129 and guide 130 (as viewed in Fig. 1). When the mandrel carriage 57 reaches such a position, the piston of the air cylinder system 101 opens the switch 110. The switch 60 mounted on the mandrel carriage 57 is also actuated to an open position.

The opening of the switch 110 de-energizes the relay 212, opening its contact 216 and closing a contact 222 also of the relay 212. The opening of switch 110 also de-energizes the solenoids 72 and 109. The de-energization of the solenoid 109 reverses the air valve associated with the air cylinder system 101 and causes the air cylinder system 101 to return its piston and the bracket 107 leftwardly to a far leftward position, as viewed in Fig. 1. It should be noted that the mandrel carriage 57 remains in a rightward position at this time. The de-energization of the solenoid 72 causes the follower 63—63 to engage the screw 51 as a result of the action of the spring 84. As the piston of the air cylinder system 101 moves leftwardly, the switch 110 is again closed; however, the contact 216 has been opened and, therefore, the relay 212 and solenoids 72 and 109 remain de-energized.

The operator then attaches the end of the cordage 10 to the mandrel 92 by means of the clamp 89. In the initial operation of the machine, the cordage 10 must be threaded from the supply reel 11 through and around the various guides, pulleys, sheaves and rollers, as shown in Fig. 4. As above-mentioned, the clamps 89 and 90 may be similar to the clamps of the above-mentioned Ames patent and more specifically to the clamps 110 and 125 of Fig. 9 of that patent. The clamp 89 would correspond to clamp 110 and would be secured to the mandrel 92 by a set screw, such as the set screw 113 of the Ames patent. As above-mentioned, the switch 60 is now open, which opening causes de-energization of the relay 182, opening the contact 186 and thereby de-energizing the solenoid 54 of the brake of the clutch-brake coupling 53, which leaves the threaded shaft 51 and the mandrel 92 turnable freely to aid the operator in attaching the cordage to the mandel 92 by means of the clamp 89. Because the pivotable unit 41 is in the closed position, the operator has enough free cordage in attaching to the clamp 89 to form an amount of free cordage on one end of the helix for stripping and securing terminals to the conductors in that end.

The operator then resets the counter 97, which brings the reading on the counter 97 to zero and closes the switch 99 causing energization of a timer relay 223, through the closed contacts 217, 222 and through the closed switches 65 and 99, resulting in immediate closing of a contact 226 of the relay 223. After a short time delay, a normally-open, time-to-close contact 227 of the relay 223 closes, causing energization of relays 196, 206 and 221, through the contacts 227 and 226, 227 and 227, respectively.

The relay 196 being energized closes its normally-open contacts 228 and 231 and opens its normally-closed contact 193. The closing of contact 228 causes energization of the relay 191 causing opening of the contact 188, resulting in de-energization of the solenoid 54 disengaging the brake of the clutch-brake coupling 53. The energization of the relay 191 also causes closing of a normally-open contact 232 of the relay 191, resulting in energization of the solenoid 49 engaging the clutch of the clutch-brake coupling 53. The opening of the contact 193 causes de-energization of the relay 192, thus causing the contact 198 to close.

The relay 206 being energized opens its contact 203, thus de-energizing the solenoid 55 of the brake 56, releasing the brake 56 to allow rotation of the motor 31 and of the rotatable carriage 13, and of the other machinery connected operatively and positively thereto.

The relay 221 being energized closes its contacts 233 and 234—234. The closing of contact 233 locks in the relays 221 and 206 through the switch 440 and the contact 233. The closing of contacts 234—234 connects the drive motor 31 to the three phase power supply through the bus lines 180—180.

The motor 31 begins to operate and causes rotation of the mandrel 92 through the various operative connections including, in part, the now engaged clutch of the clutch-brake coupling 53, the screw 51 and longitudinal keyway, the hollow shaft 86 and associated keys, the gears 87—87 and 88—88, and the shaft 91. The rotatable carriage 13 is also caused to rotate as a result of the positive drive of the motor 31 through the gear reducer 26, the pulley 22 and the V-belt 21.

The rotaton of the roatable carriage 13 causes the cordage 10 which is being drawn off of the supply reel 11 to be twisted axially while it is between the reel 11 and the sheave 113. The rotation of the mandrel 92 causes the cordage 10 to be drawn from the supply reel 11 through hte guide 112, around the sheave 113, through the accumulator assembly 116, around the sheave 128, and through the roller 129 and guide member 130 to the mandrel 92.

The mandrel 92 is moved leftwardly, as viewed in Fig. 1, by the rotation of the threaded shaft 51 which is engaged with the threaded surfaces 68—68 of the followers 63—63. As a result of the above, the cordage 10 is twisted along the longitudinal axis thereof and coiled simultaneously into a helix on the mandrel 92. It should be noted that the clamp 90, which corresponds to the clamp 125 of the Ames patent, is mounted slidably on the mandrel 92 and mainaints the approximate position shown in Fig. 1 as the mandrel carriage 57 moves leftwardly.

As the mandrel carriage 57 moves away from the support member 62, the switch 60 is allowed to close, energizing the relay 182 and closing the contacts 183 and 186. The closing of these two contacts has no effect at this time because the push button 207 is not depressed and also the contact 231 of the relay 196 is closed.

After the mandrel 92 has rotated a predetermined number of times to produce a predetermined number of coils of the cordage 10 on the mandrel 92, the counter 97 will open the switch 99, de-energizing the relay 223, opening the contacts 226 and 227. The opening of contact 226 causes de-energization of the relay 196, opening the contacts 228 and 231 and closing the contact 193. The opening of the contact 228 causes de-energization of the relay 191, opening of its contact 232 and closing of its contact 188, thus causing the solenoid 49 to be de-energized, disengaging the clutch of the clutch-brake coupling 53, and also causing the solenoid 54 to be energized, engaging the brake of the clutch-brake coupling 53 to brake the threaded shaft 51.

The braking of the threaded shaft 51 causes a cessation of rotation of the mandrel 92 and a cessation of the leftward movement of the mandrel carriage 57. It should be noted, however, that the motor 31 continues to rotate the rotatable carriage 13 and, therefore, the twisting of the cordage 10 continues even though the coiling of cordage 10 upon the mandrel 92 has ceased.

The closing of the contact 193 causes energization of the relays 192 and 197 and immediate opening of the contact 201. The opening of the contact 201 causes de-energization of relay 213 and the solenoid 134. After a time delay of a second or two, the contact 198 of the relay 192 opens, causing de-energization of the relay 197. After another second or two, the contact 201 closes, preparing the circuit for the next cycle. It should be noted that should the counter switch 99 fail to open as above-described, the mandrel carriage 57 will continue its leftward movement until it strikes the switch 65, opening that switch, which opening will have the same effect as the opening of the switch 99, stopping the mandrel carriage 57, etc.

The de-energization of the relay 213 causes opening of the contacts 217 and 218. The de-energization of the solenoid 134 causes the air valve associated with the air cylinders 132—132 to cause the pivotable unit 41 to be pivoted to the position shown in Fig. 4. As the pivotable unit 41 moves to this position, it pulls a length of cordage 10 from the supply reel 11 and produces a span 233 of cordage 10 extending between the roller 129 and guide member 130, and the mandrel 92, a portion of which span 233 is received between the jaws 139—139 of the clamp 136. The speed of pivoting of the pivotable unit 41 is adjusted so that the amount of axial twist per unit length placed in the cordage 10 by the rotation of the rotatable carriage 13 during pivoting of the unit 41 is the same as is placed in the cordage 10 during the coiling operation. In this manner, a uniform amount of twist is maintained all along the coils of each helix that is formed.

When the pivotable unit 41 reaches the open position shown in Fig. 4, the switch 40 is actuated to close in the circuit of a relay 236 and a solenoid 237 and to open in the circuit of the relays 221 and 206, de-energizing those relays causing opening of the contacts 234—234 and closing of the contact 203. The opening of the contacts 234—234 cuts off the current being delivered to the motor 31. The closing of the contact 203 causes energization of the solenoid 55 of the brake 56 bringing the motor 31 and the rotatable carriage 13 to a stop, thus stopping further twisting of the cordage 10 which is no longer being drawn from the supply reel 11.

The operator then presses two push buttons 238—238 so located as to occupy both of his hands, thus removing them from the area in which the cutting mechanism 146 will be operating. The closing of the two push buttons 238—238 energizes the relay 236, closing its normally-open contact 241 and energizes the solenoid 237. The closing of the contact 241 causes energization of the solenoid 138, tripping the arm 141 and causing the jaws 139—139 to clamp the cordage 10.

The energization of the solenoid 237 causes an air valve to admit air to the right end of the air cylinder system 148, causing the carriage 147 to be moved leftwardly, as viewed in Fig. 1. It should be noted that if the operator removes either hand from either push button 238 at any time when the carriage 147 is removed from its original position, the solenoid 237 will no longer be energized, the air valve associated with the air cylinder system 148 will be reversed and the carriage will be moved rightwardly to its original position by the air cylinder system 148.

The carriage 147 moves leftwardly, as viewed in Fig. 1, to a position abutting the support member 96, causing the switch 167 to be closed to energize the solenoid 168 thereby actuating the air cylinder system 156 to cause the jaws 151 to cut the cordage 10. After the cordage 10 is cut, the operator removes his hands from the push buttons 238—238, causing the carriage 147 to be retracted to its original rightward position.

Prior to the above-described cutting operation, the clamp 90, which was slidably positioned on the mandrel 92 throughout the winding operation, is moved against the helix 94 of the cordage 10 and the cordage 10 is clamped to the mandrel 92, for example, in the manner described in the Ames patent with regard to the clamp 125 of that patent. It should be noted that a second free end of uncoiled cordage 10 now extends from the helix 94, which free end is of the same approximate length as the distance between the mandrel 92 and the cutting jaws 151—151. It should also be noted that a length of cordage extends from between the roller 129 and guide member 130 through the clamp 136. This length of cordage will form one of the free ends of the next helix to be formed on a mandrel replacing the mandrel 92.

The operation then removes the mandrel 92 from the machine and the helix 94 is ready for heat treatment as described in the above-mentioned Ames and Kemp et al. patents. Referring to Fig. 12, the mandrel 92 is shown with the helix 94 of cordage 10 wound and clamped thereon ready for the heat treating operation. The cycle of operation of the machine is then repeated as above-described. It should be noted that after the pivotable unit 41 is again in its coiling position, the operator opens the jaws 139—139 of the clamp 136 manually to remove the cordage 10 therefrom. The eccentric face of the guide member 130 is provided so that if the operator releases pull upon the cordage while attaching it to the mandrel 92, the guide 130 and roller 129 will lock on the cordage 10 preventing it from being pulled into the machine by the accumulator 116. The guide 130 and roller 129 also function to retain the pretwist in the cordage 10 between the supply reel 11 and the guide 130 and roller 129 combination so that each helix formed on the mandrel 92 has a uniform twist throughout its length.

Related methods and apparatus to the apparatus disclosed herein may be found in the copending application of myself, E. C. Hardesty and D. L. Myers, entitled "Methods of and Apparatus for Forming Spring Cords" and filed on even date herewith, Serial No. 662,126.

It is to be understood that the above-described arrangements are simply illustrative of the application of the principles of the invention. Numerous other arrangements may be devised readily by those skilled in the art which will embody the principles of the invention and fall within the spirit and scope thereof.

What is claimed is:

1. Apparatus for forming spring cords, which comprises a frame, a cordage guide secured to said frame, a unit mounted pivotally on said frame, a mandrel mounted rotatably on said pivotable unit and positioned adjacent to said guide, means for rotating said mandrel and for moving said mandrel longitudinally for drawing cordage through said guide and forming it in a helix on said mandrel, means for pivoting said pivotable unit to a position in which said mandrel is removed from said guide for causing a span of cordage to extend between said cordage guide and said mandrel, a cordage clamp having a pair of normally open clamping jaws, said cordage clamp mounted on said frame in such a position that the span of cordage extends between said open jaws when said pivotable unit has been pivoted, means for securing the last-formed end of the helix to said mandrel, means for closing said jaws on the span of cordage, and means for cutting the span of cordage between said mandrel and said cordage clamp, whereby a pair of uncoiled ends of cordage are provided, one on the helix of cordage formed on said mandrel and one for a helix of cordage to be formed on a mandrel replacing said mandrel.

2. Apparatus for coiling axially-twisted cordage on a mandrel in the form of a helix with straight ends extending therefrom, which comprises a frame, a reel of cordage rotatably mounted in said frame, a cordage guide mounted on said frame, a unit mounted pivotally on said frame, a mandrel mounted detachably and rotatably on said pivotable unit and mounted transversely to the direction of pivoting of said pivotable unit, said pivotable unit being pivotable to a position wherein said mandrel is adjacent to said cordage guide, means for clamping cordage near an end thereof to said mandrel, means operable when said mandrel is adjacent to said cordage guide for rotating said mandrel and for moving said mandrel longitudinally to draw the cordage from said reel through said guide into a helix on said mandrel, means for pivoting said pivotable unit from the adjacent position to a position in which said mandrel is removed from said cordage guide for causing a span of cordage to extend between said cordage guide and said mandrel, means for rotating said reel about an axis transverse thereto, said cordage supply rotating means operable only while the helix of cordage and the span of cordage are being formed for producing uniformly axially twisted cordage, means for clamping the last-formed end of the helix on said mandrel to said mandrel, means mounted on said frame for holding a portion of the span of cordage, and a cordage cutter mounted on said pivotable unit and operable, after said holding means is operated, to cut the span of cordage between said holding means and said mandrel, whereby a helix of uniformly twisted cordage may be secured to the mandrel and a pair of uncoiled, free ends may be provided on each end of the helix.

3. Apparatus for forming spring cords, which comprises a frame, a cordage supply mounted in said frame, accumulator means mounted in said frame through which the cordage may be drawn from said cordage supply, said accumulator means providing a tension in the cordage as it is drawn therethrough and also absorbing shocks caused by the operation of the apparatus, a cordage guide mounted on said frame and so designed as to allow cordage to be drawn through said guide from said accumulator but not to allow cordage to be drawn through said guide toward said accumulator, a unit mounted pivotably on said frame, a mandrel mounted detachably and rotatably on said pivotable unit and mounted transversely to the direction of pivoting of said pivotable unit, means for clamping the cordage to said mandrel, means mounted on said pivotable unit for rotating said mandrel about its longitudinal axis, means mounted on said pivotable unit for moving said mandrel longitudinally, said mandrel rotating means and said mandrel moving means drawing the cordage through said guide into a helix on said mandrel, means for pivoting said pivotable unit from a position in which said mandrel is adjacent to said cordage guide to a position in which said mandrel is removed from said cordage guide for causing a span of cordage to extend between said cordage guide and said mandrel, means for rotating said cordage supply about the longitudinal axis of the cordage issuing therefrom, said cordage supply rotating means operable only while the helix of cordage and the span of cordage are being formed for producing uniform axially-twisted cordage, means for clamping the last-formed end of the helix on said mandrel to said mandrel, means mounted on said frame for clamping and holding the span of cordage at a suitable location along its length, and means mounted on said pivotable unit for cutting the span of cordage at a point between said clamping means and said mandrel, whereby a pair of uncoiled ends of cordage are provided, one on the helix of cordage formed on said mandrel and one for a helix of cordage to be formed on a mandrel replacing said mandrel.

4. The apparatus of claim 1, in which the means for cutting the span of cordage between the mandrel and the cordage clamp comprises support means mounted movably on the pivotable unit, opposed normally-open cutting jaws mounted on the support means for movement therewith, means for moving the support means to carry the cutting jaws from a retracted position remote from the span of cordage to an extended position wherein the cutting jaws are positioned immediately adjacent to and straddling the span of cordage, and means for closing the cutting jaws to cut the span of cordage when the cutting jaws are in the extended position.

References Cited in the file of this patent

UNITED STATES PATENTS

| | | |
|---|---|---|
| 1,527,490 | Reynolds | Feb. 24, 1925 |
| 1,667,749 | Spoerri | May 1, 1928 |
| 1,675,650 | Grout | July 3, 1928 |
| 2,138,784 | Cooley et al. | Nov. 29, 1938 |
| 2,393,764 | Frank | Jan. 29, 1946 |
| 2,413,715 | Kemp et al. | Jan. 7, 1947 |
| 2,466,227 | Gilman et al. | Apr. 5, 1949 |
| 2,537,457 | Gref | Jan. 9, 1951 |
| 2,547,357 | Cox | Apr. 3, 1951 |
| 2,565,465 | Ames | Aug. 28, 1951 |